US 8,558,663 B2

(12) United States Patent
Newman et al.

(10) Patent No.: US 8,558,663 B2
(45) Date of Patent: Oct. 15, 2013

(54) INTEGRATION OF FACIAL RECOGNITION INTO CROSS CHANNEL AUTHENTICATION

(75) Inventors: Kurt D. Newman, Matthews, NC (US); Sudeshna Banerjee, Waxhaw, NC (US); Timothy J. Bendel, Charlotte, NC (US); Debashis Ghosh, Charlotte, NC (US); David Joa, Pacifica, CA (US); Thayer S. Allison, Jr., Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1120 days.

(21) Appl. No.: 11/947,972

(22) Filed: Nov. 30, 2007

(65) Prior Publication Data

US 2009/0140838 A1 Jun. 4, 2009

(51) Int. Cl.
*G05B 19/00* (2006.01)
(52) U.S. Cl.
USPC ........... 340/5.41; 340/5.4; 340/5.42; 340/5.8; 340/5.82; 340/5.83; 235/379; 382/118; 382/190; 713/186
(58) Field of Classification Search
USPC ........................................................ 340/5.83
See application file for complete search history.

(56) References Cited

U.S. PATENT DOCUMENTS

| 5,386,103 | A | | 1/1995 | DeBan et al. |
|---|---|---|---|---|
| 6,142,876 | A | * | 11/2000 | Cumbers .......................... 463/25 |
| 6,484,936 | B1 | * | 11/2002 | Nicoll et al. ................... 235/379 |
| 6,608,914 | B1 | | 8/2003 | Yamaguchi et al. |
| 2001/0026632 | A1 | * | 10/2001 | Tamai ............................ 382/116 |
| 2002/0010862 | A1 | * | 1/2002 | Ebara ............................. 713/186 |
| 2002/0144127 | A1 | * | 10/2002 | Miyata et al. .................. 713/185 |
| 2002/0184538 | A1 | * | 12/2002 | Sugimura et al. ............. 713/202 |
| 2003/0006277 | A1 | * | 1/2003 | Maskatiya et al. ............ 235/379 |
| 2003/0103652 | A1 | * | 6/2003 | Lee et al. ....................... 382/118 |
| 2003/0215115 | A1 | | 11/2003 | Kim et al. |
| 2004/0133804 | A1 | * | 7/2004 | Smith et al. ................... 713/201 |
| 2005/0068165 | A1 | | 3/2005 | Kelliher et al. |
| 2005/0080326 | A1 | * | 4/2005 | Mathew ......................... 600/407 |
| 2005/0138394 | A1 | * | 6/2005 | Poinsenet et al. ............. 713/186 |
| 2005/0280502 | A1 | * | 12/2005 | Bell ............................. 340/5.83 |
| 2006/0106605 | A1 | * | 5/2006 | Saunders et al. .............. 704/246 |

(Continued)

FOREIGN PATENT DOCUMENTS

| EP | 1 635 307 A1 | 3/2006 |
|---|---|---|
| WO | WO 98/15924 | 4/1998 |
| WO | WO 2005/015512 A1 | 2/2005 |
| WO | WO 2006/023046 A1 | 3/2006 |

OTHER PUBLICATIONS

International Search Report and Written Opinion for International Application No. PCT/US2008/084833 completed Feb. 13, 2009, mailed on Feb. 23, 2009.
International Preliminary Report on Patentability mailed Jun. 10, 2010 for International Application No. PCT/US2008/084833.

(Continued)

*Primary Examiner* — Benjamin C Lee
*Assistant Examiner* — Curtis King
(74) *Attorney, Agent, or Firm* — Michael A. Springs; Moore & Van Allen PLLC; Padowithz Alce

(57) ABSTRACT

Real time facial images of individuals transacting accounts held in a bank facility are taken following the grant of authorization to the individual to access the account under the bank's required identification protocol, the real time facial images being matched to recorded facial images of account holders maintained by the bank to further authenticate the transacting individual as having authorized account access.

15 Claims, 6 Drawing Sheets

(56) References Cited

U.S. PATENT DOCUMENTS

| | | | |
|---|---|---|---|
| 2006/0239512 A1* | 10/2006 | Petrillo | 382/115 |
| 2006/0288234 A1 | 12/2006 | Azar et al. | |
| 2007/0031010 A1* | 2/2007 | Sukegawa et al. | 382/118 |
| 2007/0094512 A1* | 4/2007 | Nomiya | 713/186 |
| 2007/0180263 A1 | 8/2007 | Delgrosso et al. | |
| 2007/0295807 A1* | 12/2007 | Antos et al. | 235/382 |
| 2008/0120509 A1* | 5/2008 | Simon | 713/186 |

OTHER PUBLICATIONS

EP Examination Report dated Dec. 29, 2010 for Application No. EP 08854092.7.

Office Action issued in Chinese Patent Application No. 200880123494.5, dated Dec. 12, 2011.

Office Action issued in Chinese Patent Application No. 200880123494.5, dated Dec. 5, 2012.

* cited by examiner

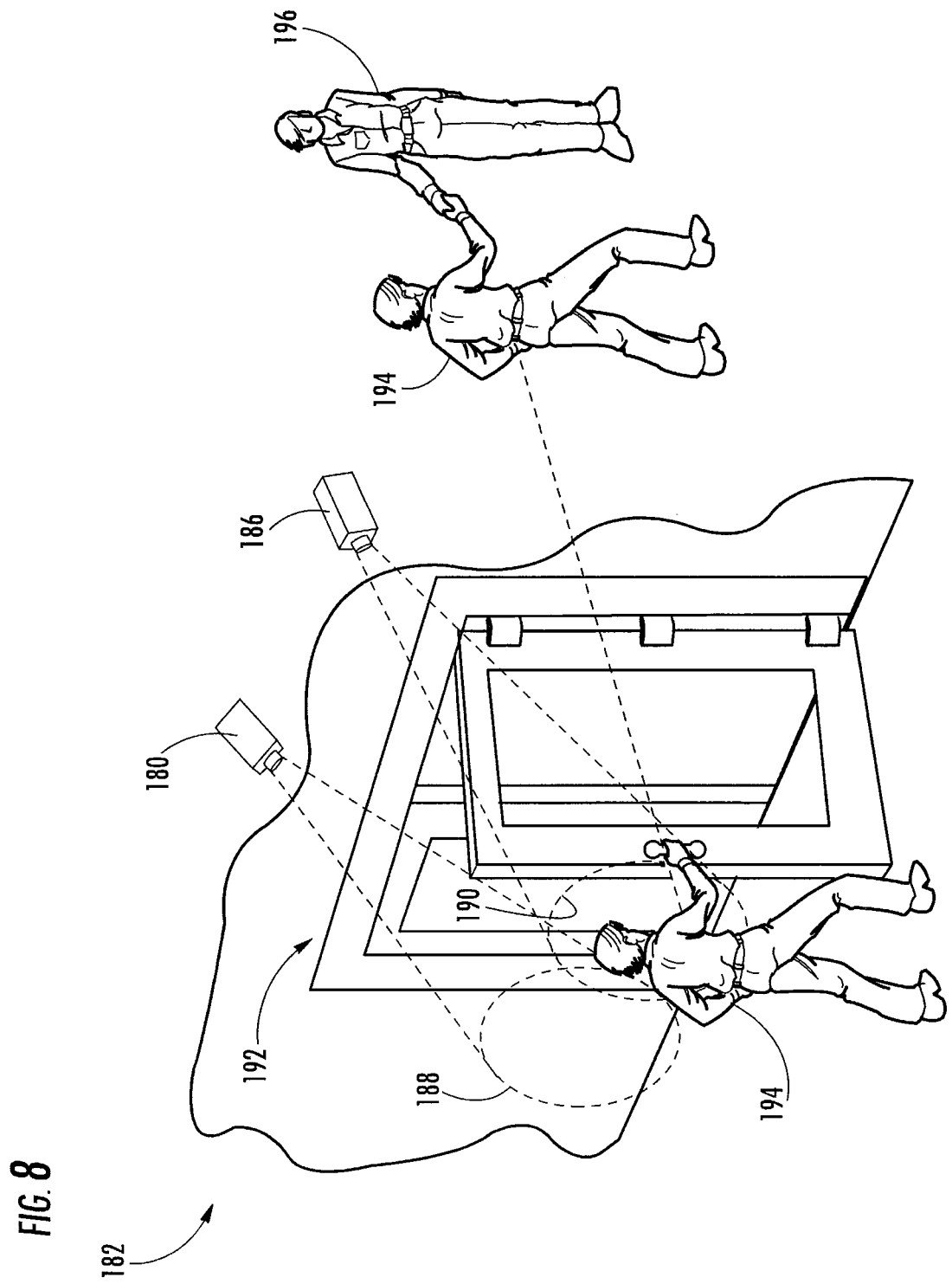

INTEGRATION OF FACIAL RECOGNITION INTO CROSS CHANNEL AUTHENTICATION

BACKGROUND

This invention relates to the field of financial services, and more particularly to improved authentication of account holders in each account transaction.

SUMMARY

The increased demand by consumers for convenience in their banking and other financial account transactions, has resulted in their greater use of automated teller machines (ATMs), direct deposit, and on-line financial transactions. The popularity of these remote transaction services, together with the greater mobility of the population and the availability of regional and national bank offices, has reduced the number of "in-person" and neighborhood banking transactions. The face-to-face transactions fostered social and business familiarity between bank personnel and the bank customers, and aside from whatever comfort this may have brought to the customer, it provided the bank with an increased defense against identity misappropriation in account transactions.

Certainly the protocols used today to verify identity and the accounts of customers conducting remote transactions, or in-person transactions in non-local bank offices, are effective in minimizing the bank's exposure to identity misappropriation. Still, the visual verification available with in-person transactions brings a further degree of security to the transaction, with no added bother or inconvenience to the customer. It is desirable, therefore, to bring this visual verification of customers to the bank's remote financial transactions as well as of customers conducting in-person transactions in non-local bank offices, for the added transaction security that it provides. It is also desirable to have the ability to recognize and/or distinguish on-site customers from among all persons that attend bank offices for in-person transactions.

According to the present invention, verifying an individual's authorization to conduct transactions with a bank account is subject both to the bank's current identification protocol as well as to authentication of the individual conducting the account transaction which is obtained by a successful matching of facial features of the individual with those facial images of persons who are of record with the bank as having account authorization. The current identification protocol is that type of information, in whatever form, that is required by the bank to prove an individual's authorization to access an account, either in an in-person transaction between individual and bank teller, or a remote transaction between individual and an automated teller machine (ATM). In addition to this identification protocol, a real time facial image of the individual is obtained and compared to the facial images of account holders that are stored in an image database file that is associated with the account. The matching of a selected number of facial features between the immediate real time image and the recorded images provides authentication, while the absence of matching features may be used to deny account access.

The facial images of the account holders and the individual transacting the account are preferably digital signal images in a selected image resolution. The initial facial images stored in the image database are preferably obtained at the time the account is opened, and more than one image may be recorded. Facial images are then taken in each following account transaction and those successfully match the recorded images are themselves then recorded to provide a tracking of the account holder's changing facial features due to changing styles or simply aging. Preferably a selected N number of facial images are maintained in the account image file and as each current facial image is added the earliest recorded image is deleted.

To minimize the delay or inconvenience to bank customers that may occur in accessing their accounts pending this authentication, there is a default authorization in the event an individual satisfies the current identification protocol requirements but there is no account image file on file. This may occur with accounts that are established prior to implementation of this security feature. It is preferable in these instances to then notify the individual of the authentication protocol and to request their permission to take a real time facial image. An account image file may then be created and the acquired images(s) stored in the file. In the event the customer refuses permission to take their image the default is to then grant the customer account access without the captured image in the interest of customer relations.

In another aspect of the invention the recorded facial images of account holders may be used to notify bank personnel, such as a bank greeter, to the on-site presence of important bank customers. This is done by comparing real time images of individuals entering a bank facility with recorded facial images of customers that may be stored in an image database in linked association with that facility or, if considered reasonable, with customers of all of the bank's facilities which may be stored in remote data warehouse sites.

These and other features and advantages of the present invention will become apparent in light of the following detailed description of exemplary embodiments thereof, as illustrated in the accompanying Drawing.

BRIEF DESCRIPTION OF THE DRAWING

FIG. 8, is a figurative illustration of an application of another aspect of the present invention.

DETAILED DESCRIPTION OF THE INVENTION

Figure 1:
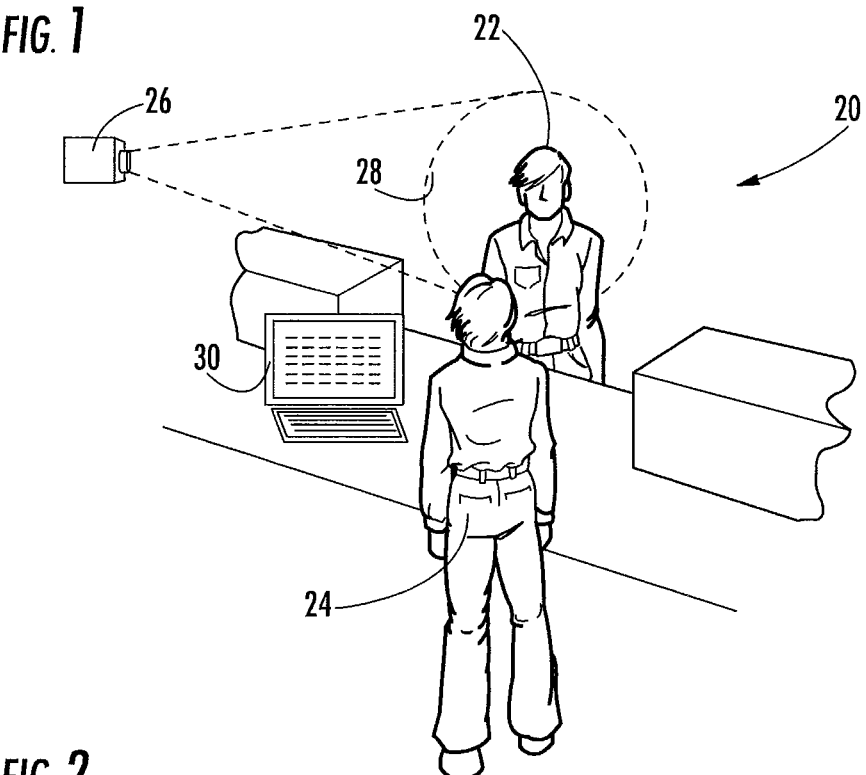
FIG. 1 through FIG. 4 are figurative illustrations of examples of how the present invention may be applied.

The method of the present invention may be used in each of the various forms of account transactions that are offered by a bank. FIGS. 1 through 4 are figurative illustrations of different transaction formats. FIG. 1 illustrates an in-person transaction at a teller station 20, which occurs between an individual 22 and a bank teller 24. The transaction is conducted in standard fashion with the individual 22 providing account and personal identification, as required by the identification protocols that are then required by the bank. A camera 26 has an optical field of view (FOV) 28 that encompasses the area in front of the teller station and is capable of capturing the facial images of individuals having an anticipated range of heights which may be based on a statistical average human height with selected mean deviation. This range must also include individuals who are handicapped and may be in wheelchair or other ambulatory assist apparatus. The camera 26 is a known type digital signal camera with a focal length capable of capturing clear digital images of the face of individuals within its FOV.

As described in further detail below with respect to FIGS. 5 and 7, prior art imaging software is used to screen the real time images captured by the camera 26, and to select a facial image frame that provides a facial image that exceeds the bank established minimum for a full sized facial image. As known to those skilled in the visual image arts, the fullness of the facial image is measured by the extent of its "footprint" against the background image. With entry of the account information by the teller through teller workstation 30 into the bank's data system (FIG. 7), the data system verifies the account identity which is reported on the teller workstation screen. With identification of the account the data system then determines if there are recorded facial images of the account holder stored in an image database (FIG. 7) at address locations linked to the account number. If available, the recorded facial image is retrieved and imaging software is used to create a template of selected facial features. The same process and template format is used to organize the selected facial features from the real time facial image from camera 26. Using known algorithms the imaging software extracts and compares like kind template feature categories to determine matching characteristics between the real time and the recorded images. The number of matching template categories required to establish a successful matching between images is selected by the user in consideration of the authentication accuracy required. A guide to this selection may be based on matching accuracy guidelines established by those skilled in the art persons working in the imagery field.

A successful matching of images is reported by the data system to the teller workstation. Limiting the matching process to images that are stored in association with the identified account limits the process time required. Matching a single recorded image to the real time image can occur within a few seconds, and even if it is necessary to match the real time image to more than one recorded image the process may be completed well within a reasonable waiting time, thereby minimizing inconvenience to the customer.

A successful matching authenticates the individual's right to access the account, and that authorizes the transaction. The teller then completes the transaction. Under the method of the present invention, the successful matching also certifies the real time facial image as being that of the account holder, and this image is itself then stored in the image database. This enhances the integrity of the image matching protocol by recording each transaction's matched real time image as the most current depiction of the account holder. In an exemplary embodiment of the invention, three facial images are stored, each with its time tag to date the image. This ensures that the image database tracks changes in the facial features of the account holder(s). These changes might be due to the addition or removal of facial hair, facial injury, or simply aging. With the addition of each new recorded facial image the oldest (longest stored) image is deleted.

Figure 2:
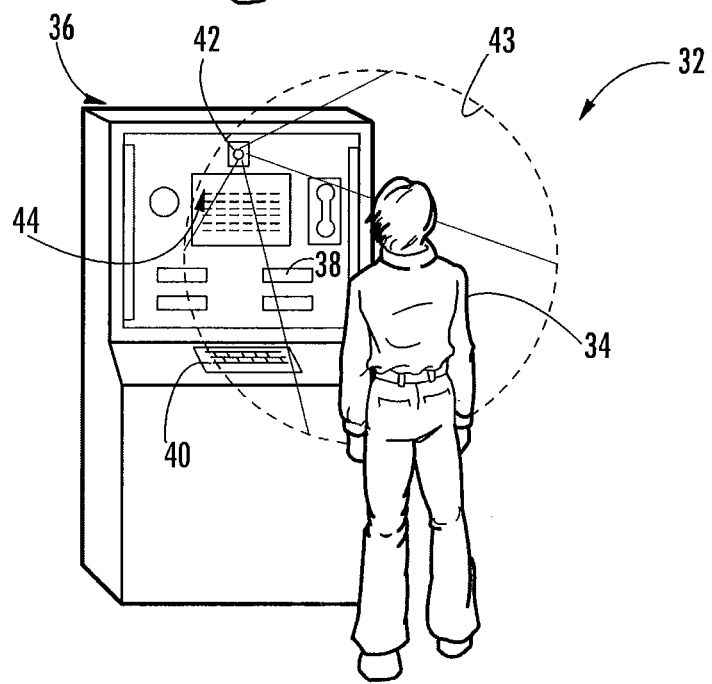

FIG. 2 illustrates an ATM transaction 32 in accordance with the present invention. The ATM transaction is considered to be a remote transaction in that it is not face to face with a teller. An individual 34 enters the account information and personal identification code into the ATM 36 in the form required by the bank's identification protocol. This may include inserting a magnetic card (not shown) into the ATM card reader 38 and entering a personal identification number (PIN) into keypad 40 before being granted authorization. With identification of the account the bank data system searches for an account associated recorded facial images of the account holder in the image data base (FIG. 7), and camera 42, also a known type digital signal camera with an optical FOV 43 and focal length capable of capturing clear digital facial images of anyone standing in front of the ATM. The real time facial images are monitored by imaging software that selects the image frame to be compared based on the fullness of the facial image. The ATM transaction is halted pending the presence of a successful image matching. Successful image matching authenticates the individual and permits the transaction to continue to completion.

Figure 3:
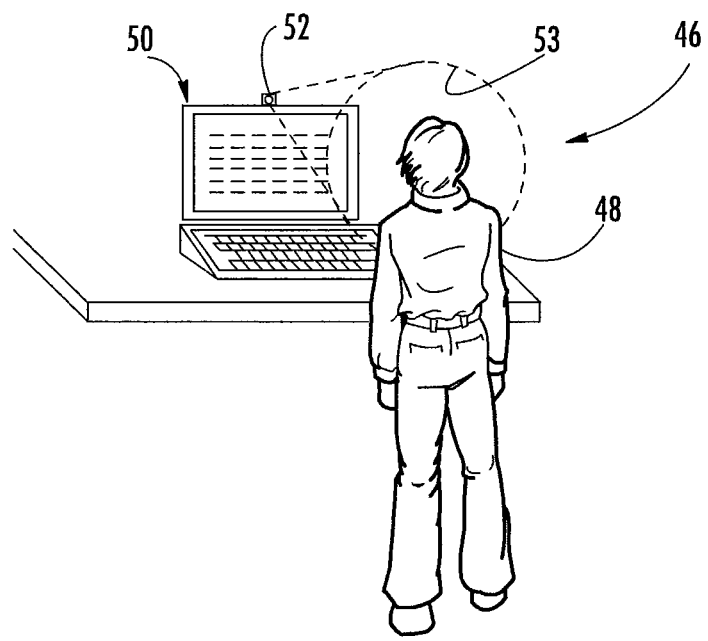

FIG. 3 illustrates an on-line transaction 46 by an individual 48 using a personal computer 50. In this example it is assumed that bank policy requires on-line users to have and use a video camera when conducting an on-line transaction, and the personal computer 50 is shown to have a video camera 52 with a FOV 53 to provide the real time facial images of the individual 48. Similar to an ATM transaction the individual enters the account information and personal identification information into the computer 50 in the form required by the bank's identification protocol. The process then continues in substantially the same manner as the ATM transaction, including the bank data system search for account related image files in the image data base and the matching process between the real time facial image and any stored facial images. The transaction is suspended until a successful match is made and, when made, the transaction is authenticated and continues to completion. If the account has no image file in the image data base the assumption is that none has yet been created, and a default authentication allows the transaction to continue to completion based on the success of the identification protocol entries.

Figure 4:
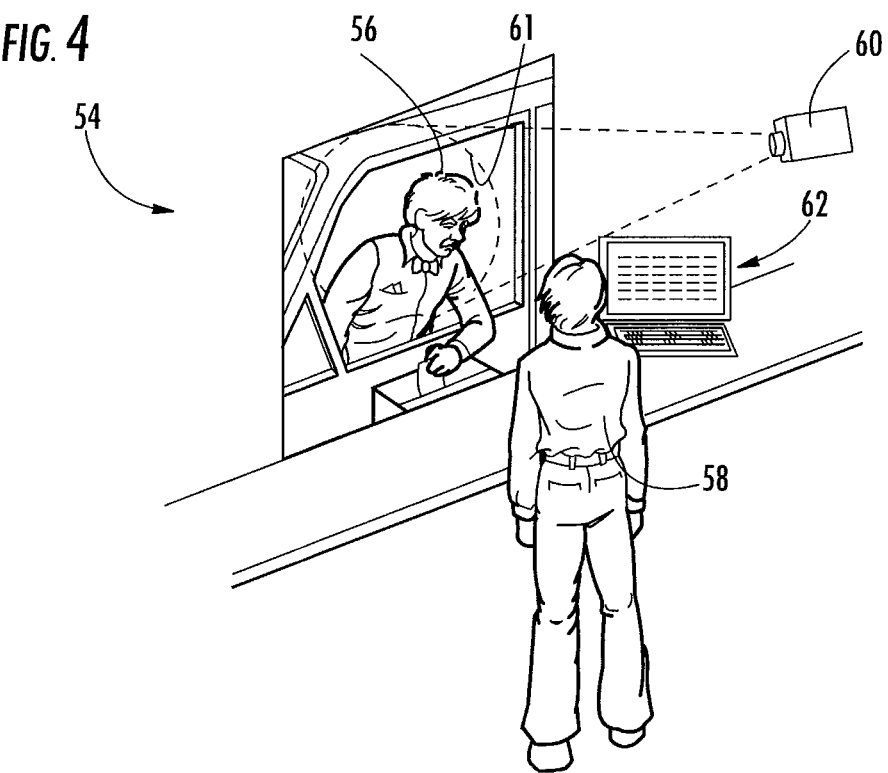

Finally, FIG. 4 is a drive-up window transaction 54 between the individual 56 and teller 58. The individual 56 provides account and personal information in accordance with the bank required identification protocol, and a camera 60 with FOV 61 provides real time facial images of the individual. The account number is entered by the teller 58 into the bank data system through workstation 62. With identification of the account the bank data system retrieves any account related image files that are on file in the image database, and those stored images are then compared with a selected real time image to find a match of the bank specified number of facial characteristics. The process is performed in the same manner as described above with respect to FIGS. 1-3. The transaction is suspended pending either a successful image matching or, in the absence of an account image file, a default authentication, which is displayed on the workstation 62 authorizing the teller to complete the transaction.

Figure 6:
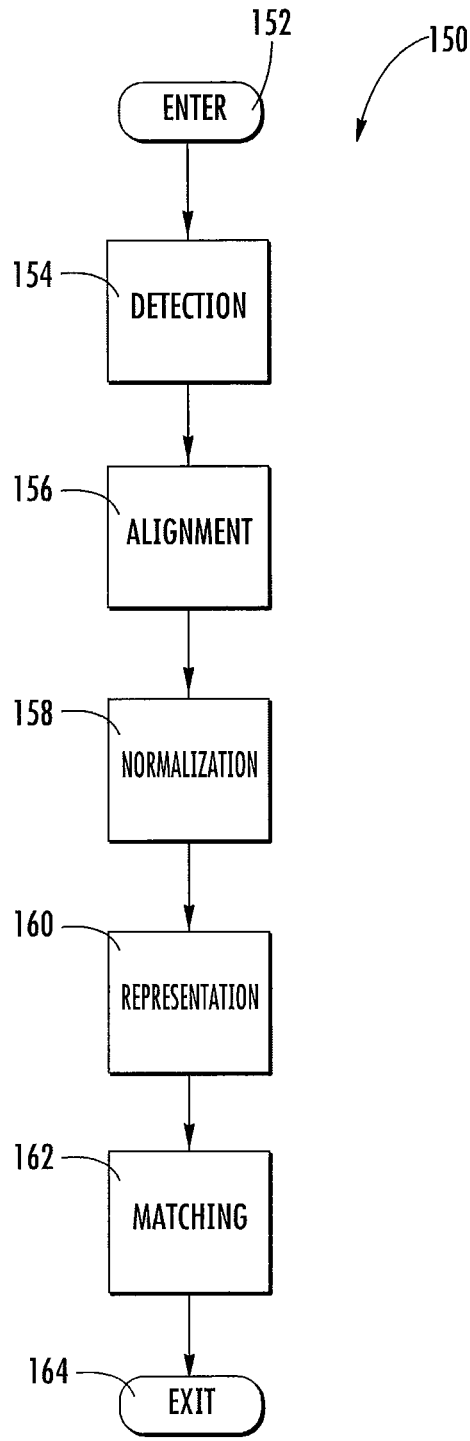
FIG. 6, is a flow chart diagram illustrating further details of the functional steps illustrated in FIG. 5.
Figure 7:
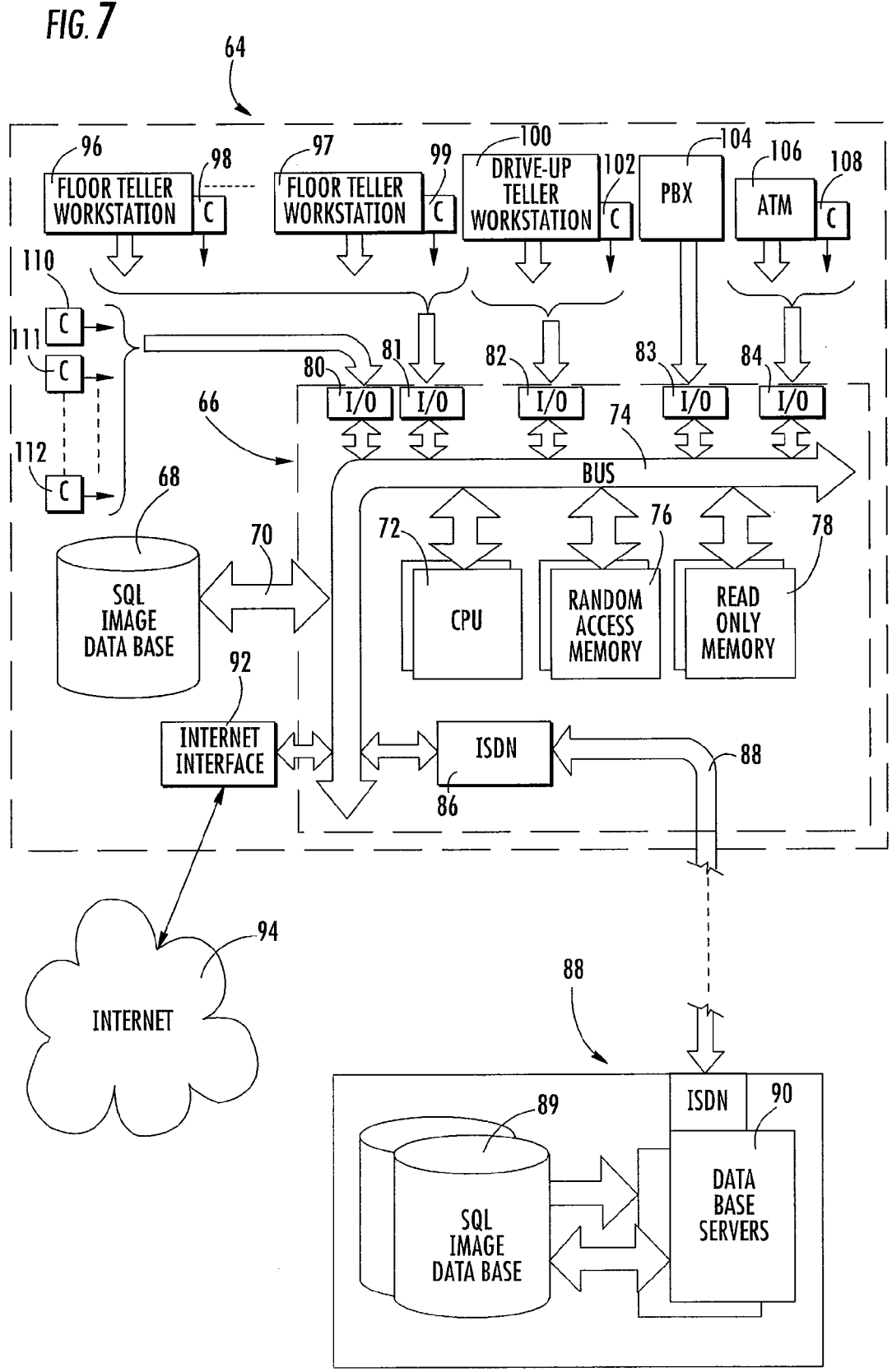
FIG. 7, is a schematic block diagram of apparatus in which the exemplary embodiment of FIG. 5 and FIG. 6 may be performed.

FIG. 7 is a simplified schematic block diagram of an exemplary bank facility 64 in which the transactions of FIGS. 1-4 may be performed. The facility data system includes a main frame computer data server 66 that supports all financial transactions that are performed at or through the facility 64, and an image data base 68 which communicates with the server 66 through interface 70. In the simplified block diagram shown the server 66 includes a central processing unit (CPU) 72, that communicates through bus 74 with random access memory (RAM) 76, read only memory (ROM) 78, interface 70 of the image data base 68, and input/output (I/O) devices 80-84. The CPU also communicates through an integrated services digital network (ISDN) interface 86 to a remote data warehouse 88 with archive image data bases 89 and data servers 90, and through network interface 92 to the internet 94. Within the facility, the server bus 74 communicates through I/O interfaces 81-84 with: (i) floor teller workstations 96, 97 and their associated cameras 98, 99 (see also 30 and 26, FIG. 1), (ii) drive-up teller workstation 100 and camera 102 (see also 62, 60 FIG. 4), (iii) the facility's telephone switch (PBX) 104, and (iv) the ATM 106 and its camera 108 (see also 36, 42, FIG. 3). The server communicates through I/O 80 with an additional plurality of cameras 110-112 that are disposed throughout the facility's public space separate from the transaction cameras described above. The cameras 110-112 relate to a different aspect of the invention and are discussed in greater detail hereinafter with respect to FIGS. 6 and 8.

Figure 5:
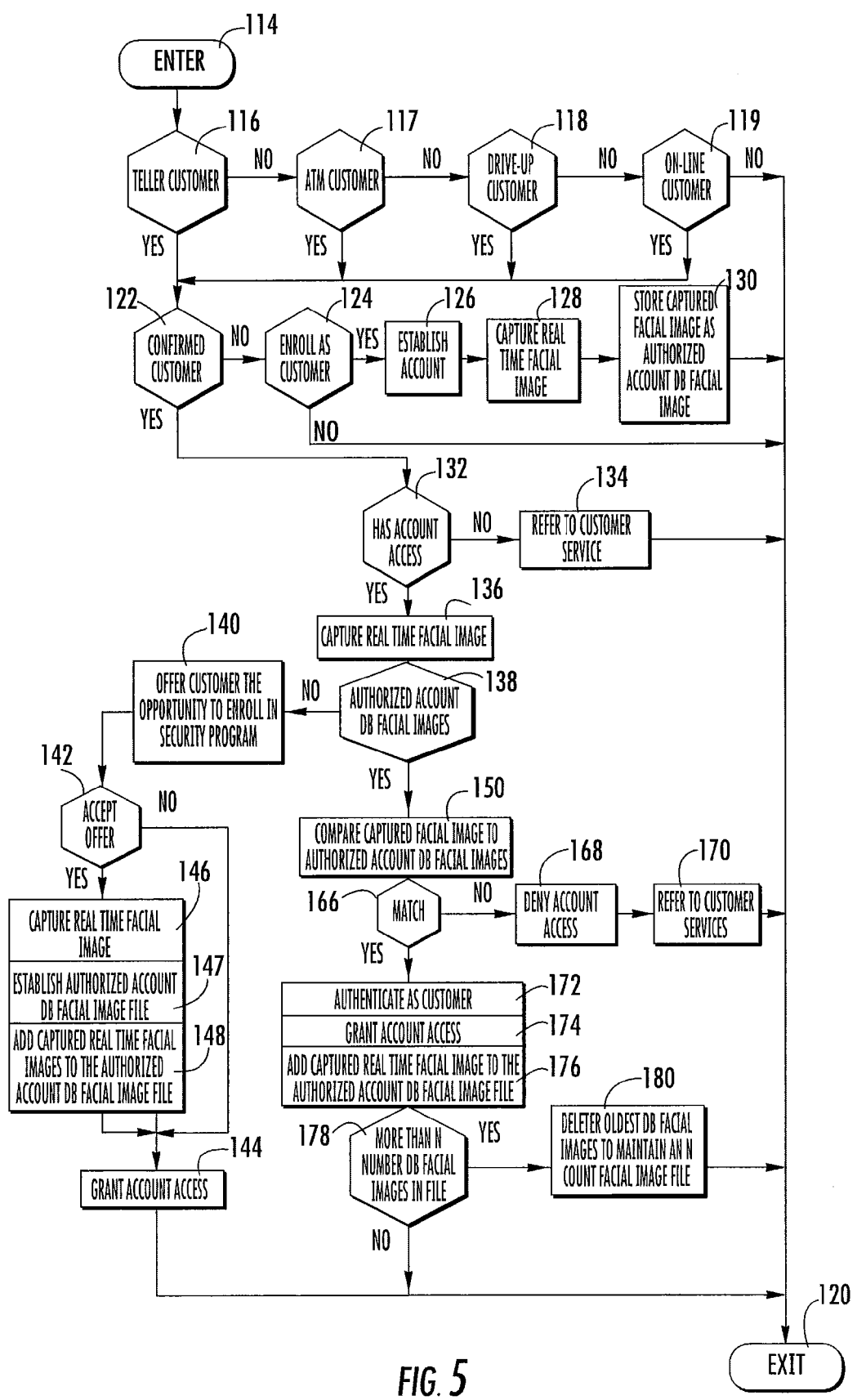
FIG. 5, is a flow chart diagram illustrating the functional steps of an exemplary embodiment of the invention used to perform the applications of FIGS. 1 through 4.

FIG. 5 is a flow diagram illustrating the steps of the transaction module performed by the server 66 (FIG. 7) in executing the method of the present invention for the example embodiments of FIGS. 1-4. The servers enters the transaction module at 114, and steps 116-119 determine which one or all of a floor teller, an ATM, a drive-up teller, or on-line transaction is taking place. If there are no current transactions the server exits at 120. With any transaction that is in process, step 122 determines if the individual is a confirmed customer based on the proofs they provide under the identification protocol then in effect. In response to a NO answer, indicating that the individual is not a current bank customer, step 124 offers the individual the opportunity to enroll as a customer.

The offer to enroll is optional, and if the individual refuses to enroll, a NO answer has the server exit at 120. In response to a YES answer, step 126 then establishes the type of account and account identification number, and step 128 records a real time facial image of the individual, which in step 130 is stored in an account associated facial image file in the image data bases 68 and 89 (FIG. 7). The 126, 128 and 130 steps may be performed immediately for individuals who are Teller or Drive-Up customers, and ATM or Dial-Up customers will be referred to a Customer Service Representative for further instructions. As described above, it is preferred to have the method maintain several images over a time period related to the frequency of account transactions. When the selected maximum number of images is achieved (preferably three) the latest real time image that produces a successful match with a recorded facial image is then stored as the most recent customer image in the account facial image file in the image data base.

If step 122 confirms the individual as a current customer based on the identification protocol, step 132 determines if the individual has account access and if they do not step 134 refers the transaction to customer service and the server exits at 120. This is an infrequent event, such as an account that was earlier closed by the bank or possibly the customer, who has forgotten. If the individual does have account access, step 136 captures their real time facial image. Step 138 then determines if there is a facial image file in the image data base that is associated with the identified account. If there is no related account facial image file, as is likely for customer accounts that were established prior to institution of the security program that embodies the facial authentication method, step 140 offers the customer the opportunity to enroll in the program.

The incentive to the customer to enroll in the security program is the added account security that it provides. If, however, the customer refuses, step 142 enacts a default authentication which grants the customer access to the account in step 144. If the customer does accept enrollment, step 146 captures the customers facial image and step 147 establish an account associated facial image file. Step 148 then stores the captured real time image to the created facial image file in the image data base. The customer is then granted account access in step 144 and the server exits at 120.

If step 138 determines that there is a related account facial image file, step 150 retrieves the first of the recorded facial images in the file and performs the process of comparing it to the real time image captured in step 136. The image matching steps performed are those well known in the art for making comparisons between images. In this method each real time image must be first converted to an image template which is functions as an abstract of facial features that are pre-selected by the bank or their software provider. Referring now to FIG. 6, which is a simplified flow diagram of the steps performed by the server in step 150. The process begins at 152 and step 154 detects the presence of a real time image which is a sequence of real time frames that are monitored to detect an image frame having a fullness to the facial portion of the image. This is done by distinguishing the facial image from the background image using filtering software.

The detected image frame is then placed in alignment with the image template in step 156 and normalized to the template outline in step 158. Step 160 then extracts the digital signal content in the template selected areas to create the template features to be matched to the recorded facial image retrieved from the account facial image file, which is already in the desired extracted feature template form. Step 162 then compares the individual features with their counterpart facial feature in the other template. A successful matching occurs when there is a selected objective criteria match among the user selected number of overall template features. In the event that the selected number of features cannot be matched, which may occur if the account owner has undergone facial changes due to changed physical circumstances, the matching process may be repeated with another one of the recorded facial images in the account image data file. The results of the matching process are reported in step 166 of FIG. 5, and the server exits the routine 150 at 164.

Referring again to FIG. 5, step 166 reports the results of the matching step 150. If there is no match, step 168 denies the individual account access and step 170 refers the transaction to the bank's customer service entity. If there is a match, step 172 provides authentication of the customer and step 174 grants the customer account access. Step 176 stores the matching real time facial image template in the account facial image file as the most current customer image. Step 178 determines if there are now more than a selected N number of facial images stored in the account image file. If the answer is NO, the server exits the module at 120. If the answer is YES, step 180 deletes the oldest of the earlier stored images to achieve the N count, and the server then exits the module at 120.

Referring again to FIG. 7, the data for all customer accounts which originate at the bank facility 64, including all account associated facial image files, are stored both locally in the facility's on-site image data base 68, as well as remotely in the data warehouse 88. Banks having multiple facilities would likewise have local account information stored locally as well as being duplicated in one or more remote data warehouses for backup purposes. In this exemplary embodiment of the invention it is assumed that the majority of the account transactions at the facility occur in accounts that originate with the facility, and the search and retrieval of account information is first attempted from the local data base 68. The process time for retrieving and matching the real time image with locally stored account image files is accomplished quickly enough to go unnoticed by the customer or individual. The retrieval and matching of images from the data warehouse 88 requires greater time and may result in a noticeable, but not an intolerable delay.

Although other biometric measures, such as finger and palm print matching may be used to authenticate account customers, facial recognition provides the metric that is most transparent to individuals transacting business with the bank. To that extent it provides a business as usual atmosphere while also providing the greater degree of account security. It also provides the greatest degree of flexibility, since users select both the facial features to be matched as well as the number of matches necessary to authenticate. In this context, facial features are defined as any facial physical feature of the person that is publicly visible. In this way the present facial recognition authentication method may further develop or improve as new technology is developed.

There is the recent multi-modal biometric identification product software suite, which is capable of identifying persons using iris recognition and/or facial recognition; either one being used alone or in combination with other to provide a highest degree of certainty. It is able to perform these recognition functions in high pedestrian traffic venues, such as the public space of a large banking facility. Similarly, while the bi-modal biometric identification protocol of the multi-modal biometric identification product provides a highest degree of accuracy when both iris and facial biometric data measures are acquired, it is capable of obtaining one data measure when the other is masked (e.g. facial recognition in the presence of sunglasses or iris recognition in the event of facial cover). Therefore, it should be understood that the facial recognition authentication method of the present invention is not limited to any specific facial features but is intended to embody all such features which are capable of measure in a public setting, such as a banking facility.

Another aspect of the present invention is to extend the use of facial recognition to provide notice to bank personnel of bank customers that are on site but who have not been involved in an account transaction and may go unnoticed on the bank floor. Whether the bank wishes to extend courtesies to these customers, either as having preferred status, or simply to greet them by name and give them personal recognition; all of which is important for customer relations. FIG. 8 is a figurative illustration of an exemplary embodiment 182 of a customer recognition function, which here is shown to include surveillance cameras 184, 186 that are mounted in the facility in such a manner as to give them field of views 188, 190 that cover a main entrance 192 to the bank facility. The cameras 184, 186 are known type digital signal cameras with focal lengths that can obtain good resolution real time facial images of an individual 194 appearing at the entrance 192. With matching of the real time facial image to recorded facial images of account holders, a bank representative 196 may then be dispatched to greet the identified customer by name and offer assistance.

Figure 9:
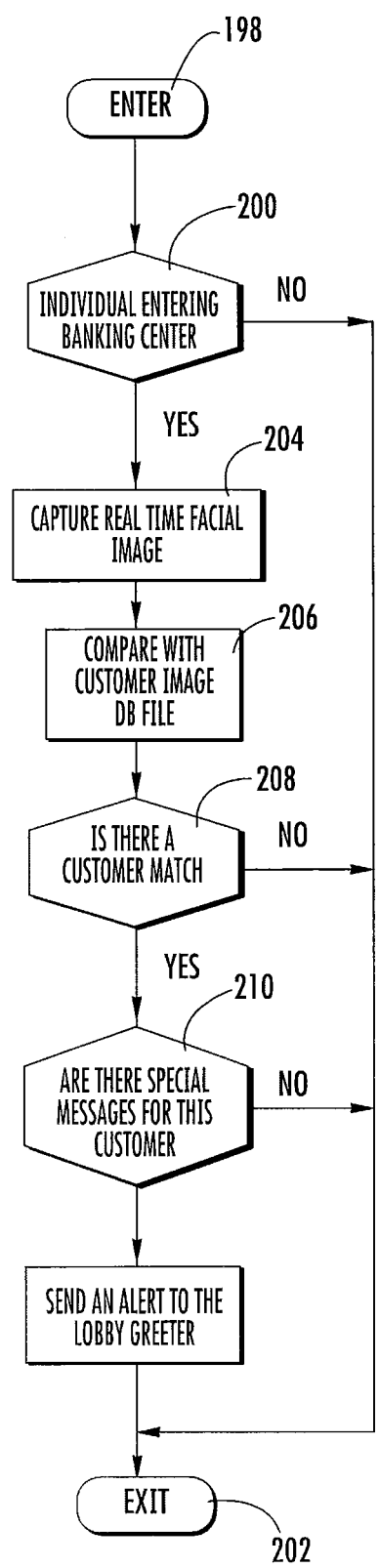
FIG. 9, is a flow chart diagram illustrating the functional steps of an exemplary embodiment of that aspect of the invention used to perform the application of FIG. 8.

FIG. 9 is a flow diagram of the steps performed in the embodiment 182 of FIG. 8. The server 66 enters the customer recognition module at 198 and step 200 determines if there is an individual entering the banking facility. If the answer is NO the server exits at 202. Following a YES confirmation that an individual is entering, step 204 captures a real time facial image of the individual and step 206 compares the captured real time image with recorded facial images of account holders from image files associated with locally originating accounts. Step 208 determines if a customer match has been made to the real time image. If no match has been made the server exits at 202. If a match is made, step 210 determines if there are any special message for this customer, whether of an account nature or simply promotional material. If no messages are found the server exits at 202, but if there are messages to be delivered step 212 dispatches a bank representative, such as a lobby greeter to meet the customer and deliver the information.

This customer recognition function is intended to run in the background and several surveillance cameras may be used (e.g. cameras 110-112 of FIG. 7), each positioned as to provide collective coverage of the facility's public spaces and public entrances. The matching of real time facial images on the floor to those of account holder may take several minutes if all of the facility's originating account files must be queried. In that case the matching of a real time image of a customer at entrance 192 may not be made until well after a customer is on the bank floor. However, once identified, the bank greeter is provided with a workstation display of the name and picture of the identified customer, together with the information to be communicated. If necessary to minimize the process time for finding an image match, a smaller database of very important customers may be maintained which may then substantially limit the process time.

In addition to the customer verification that the present facial recognition method provides to bank transactions, as well as the ability to recognize customers that are on site in the public areas of the banking facility, it also provides an ability to compile an image data base of persons who may be undesirables. These may be individuals who have either been shown to have attempted or succeeded in completing subversive transactions with the bank or other dishonest activities involving the bank. This image database could be compiled from the transaction and public space surveillance cameras within the bank, as discussed above, or such image sources that are available to the bank, including digital signal facial images available from law enforcement agencies. Real time transaction facial images as well as public space facial images may then be compared to this database of undesirables to notify bank personnel of their presence on site. The bank may then take any action it then deems necessary or appropriate under the circumstances.

The facial recognition features of the account authentication function as well as the customer identification function are intended to be to be unobtrusive to the customer, and to be performed in a passive, transparent manner to provide minimum interference with the customers normal course conduct. The customer will be aware of the visual verification process but not the execution of the process except in the event of equipment malfunction or attempted fraud by an imposter. Also, the authentication function is independent of and supplemental to whatever other protocol is in effect for authorizing customer access to the accounts. In those instances where there is no account image file of record, the bank's current identification protocol alone authorizes account access.

Although the invention has been shown and described with respect to exemplary embodiments thereof, it should be understood by those skilled in the art that various changes, omissions, and additions may be made to the form and detail of the disclosed embodiments without departing from the spirit and scope of the invention, as recited in the following claims.

We claim:

1. An apparatus configured to authenticate an individual who is initiating a bank account transaction as having authorization to access the bank account, the apparatus comprising:
   an imaging device configured to obtain a real time image of two or more facial features of the individual;
   a memory device comprising bank account-associated image files, each bank account-associated image file comprising one or more recorded images of one or more facial features of one or more persons who are authorized to access the bank account;

a processing device communicably coupled to the imaging device and the memory device, wherein the processing device:

receives a level of accuracy number from the individual, wherein the level of accuracy number is, at least, two, wherein the level of accuracy number is received prior to when the individual initiates the bank account transaction;

receive selections, by an entity other than the individual, of facial features of the individual to be used in authenticating the individual for the bank account transaction, wherein a number of facial features selected by the entity is based at least partially on the level of accuracy number received from the individual, wherein a number of successful matches of facial features required to grant bank account access is based at least partially on the level of accuracy number received from the individual, wherein the entity selecting the facial features of the individual to be used in authenticating the individual is an entity associated with the bank that maintains the bank account;

obtain, using the capture device, the real time facial image of the individual;

select two or more facial features shown in the obtained real time facial image of the individual based on the selection of facial features by the bank to match to thereby grant access to the bank account;

compare each of the two or more facial features selected by the processing device obtained real time image to a plurality of facial features of the one or more recorded facial images;

detect matching facial feature image pairs when each of the facial features of the individual that was selected by the bank matches successfully with, at least, one of the plurality of facial features of the one or more recorded facial images;

provide a default authorization for accessing the bank account access when the processing device fails to identify the bank account associated image file, the default authorization comprising:

a) providing, via a communication interface, a notification, to the individual, indicating that the processing device failed to verify the financial account based on failing to identify the image file that is linked to the financial account;

b) requesting, from the individual, permission to obtain, during the default authorization, at least one facial image of the individual in real-time;

c) obtaining, during the default authorization, the at least one facial image of the individual in real-time based at least partially on receiving the permission from the individual;

d) generating a new image file and linking the new image file to the financial account;

e) storing the at least one facial image of the individual obtained during the default authorization in the new image file that is linked to the financial account; and grant to the individual access to the bank account when the processing device detects that the number of facial features selected by the bank for matching is satisfied and that each of the selected facial features match, at least, one of the plurality of facial features of the one or more recorded facial images.

2. The apparatus of claim 1, wherein at least one of the two or more facial features comprises, at least, an iris.

3. The apparatus of claim 1, wherein the real time image of the two or more facial features comprises a real time image of an iris of the individual, wherein the one or more recorded images of one or more facial features comprises one or more recorded images of one or more irises, and wherein the processing device is configured to compare the obtained real time image of the iris with the one or more recorded images to detect a matching iris pair.

4. The apparatus of claim 1, wherein the real time image of the two or more facial features comprises a real time image of the individual's face, wherein the one or more recorded images of two or more facial features comprises one or more recorded images of one or more faces, and wherein the processing device is configured to compare the obtained real time image of the individual's face with the one or more recorded images to detect a matching face pair.

5. The apparatus of claim 1, wherein the real time image of the two or more facial features comprises a real time image of the individual's iris or the individual's face, wherein the processing device is configured to compare the obtained real time image with the one or more recorded images to detect a matching iris pair and a matching face pair, and wherein the processing device is configured to grant account access to the individual in response to the presence of either a matching image pair or a matching face pair.

6. The apparatus of claim 1, wherein the processing device is further configured to deny account access to the individual in response to the absence of a matching image pair.

7. The apparatus of claim 1, further comprising:

a communication system configured to provide information to the individual, wherein the processing device, as part of authorizing default account access, is configured to offer the individual the opportunity to enroll in a program which authenticates the authority of each individual accessing the account by matching each individual's real time image of two or more facial features to one or more recorded images maintained by the bank of one or more facial features of one or more persons authorized to access the account.

8. The apparatus of claim 7, wherein the processing device is further configured to create, in response to acceptance by the individual of such offering, an account-associated image file in the memory device to maintain each such obtained real time image of two or more facial features as a recorded image of one or more facial features of a person authorized to access the account.

9. The apparatus of claim 1, wherein the processing device is further configured to:

use, at the time of opening a bank account, an imaging device to capture an initial real time image of a facial feature of each individual having authority to access such account; and create, in the memory device, an account-associated image file to maintain each such acquired initial real time image as a recorded image of a facial feature of a person authorized to access the bank account.

10. The apparatus of claim 9, wherein the processor is further configured to add to the account-associated image file each most recent successfully-matched real time image obtained in each most recent account transaction in which an imaging device captured a real time image.

11. The apparatus of claim 10, wherein a selected N number of recorded images of one or more facial features for a person is maintained in the account-associated image file, wherein N is greater than or equal to two.

12. The apparatus of claim 1, wherein the processing device is configured to grant account access to the individual in response to the presence of a matching image pair by notifying an appropriate bank employee of authorization based on the presence of a matching image pair.

13. A method of authenticating an individual that is initiating a bank account transaction as having authorization to access the account, the method comprising:
   acquiring, at the time of opening a bank account, an initial real time facial image of each individual having authority to access such account;
   creating an account associated image file to maintain each such acquired initial real time facial image as a recorded facial image of an individual authorized to access the account;
   initiating, by the individual, a bank account transaction, wherein the initiating comprises:
   a) receiving an account information that identifies a bank account associated with the bank account transaction; and
   b) receiving a personal identification number that is associated with the bank account and that when provided by the individual along with the account information satisfies successfully initiates the bank account transaction;
   verifying, based at least partially on the successful initiation of the bank account transaction:
   a) an existence of the bank account,
   b) a bank account associated image file of one or more recorded facial images of one or more persons authorized to access the bank account,
   c) and the authority of the individual to access the account under a bank required identification protocol;
   providing a default bank account access to such individual when the processing device does not locate the bank account associated image file of recorded facial image of persons authorized to access the account, wherein providing the default bank account access comprises:
   a) providing a notification to the individual indicating that the processing device failed to locate the bank account associated image file,
   b) requesting, from the individual, permission to obtain, during the default authorization, at least one facial image of the individual in real-time;
   c) obtaining, during the default bank account access, a real time facial image of the individual;
   d) creating, in response to the absence of an account associated image file of recorded facial image of persons authorized to access the account, an account associated default authorization image file; and
   e) storing in the default authorization image file the real time facial image of persons who are granted default authorization to access the account;
   receiving from the individual a predetermined number of successful matches of facial features required to grant account access;
   selecting, by a processing device, two or more facial features shown in the obtained real time facial image of the individual to match to thereby access the account based at least on the predetermined number of successful matches of facial features received from the individual;
   comparing:
      the two or more facial features selected by the processing device to two or more corresponding facial features shown in a recorded facial image of a person authorized to access the account, wherein the recorded facial image is maintained by the bank in an account associated image file of one or more persons who are authorized to access the account;
   detecting matching facial image pairs, of at least, the predetermined number of successful matches of facial features received from the individual;
   granting to the individual access to the account when the processing device detects the predetermined number of successful matches of facial features by notifying an appropriate bank employee of authorization based on the presence of a matching image pair;
   adding, to the account associated image file, as a recorded facial image of persons authorized to access the account, the obtained real time image of the individual based on the detecting matching facial image pairs, of at least, the predetermined number of successful matches, wherein a selected N number of recorded facial images of persons authorized to access the account is maintained in the account associated image file, wherein N is three, and wherein the longest maintained one of the recorded facial images in the account associated image file is deleted in response to the adding of each most recently added recorded facial image, as necessary to maintain the selected N number of recorded facial images; and
   wherein detecting matching facial image pairs comprises:
   a) selecting a most recent recorded facial image in the account associated image file to detect a matching image pair with the obtained real time image; and
   b) continuing, in the absence of achieving a matching image pair therefrom, with selecting a next most recent recorded facial image in the account associated image file for comparison with the obtained real time image to detect an image pair.

14. The method of claim 13, wherein the step of comparing further comprises comparing the obtained real time facial image with recorded facial images maintained by the bank in the account associated default authorization image file to detect a matching image pair.

15. The method of claim 13, further comprising:
   transforming each most recent successfully matched real time facial image obtained into a facial image template to be added to the account associated image file as a recorded facial image of persons authorized to access the account, the facial image template presenting the selected number of facial features to be compared in an abstract format for ease of comparison.

* * * * *